United States Patent
Shiu et al.

(10) Patent No.: US 7,742,111 B2
(45) Date of Patent: Jun. 22, 2010

(54) HIGHLIGHT DETECTING CIRCUIT AND RELATED METHOD FOR AUDIO FEATURE-BASED HIGHLIGHT SEGMENT DETECTION

(75) Inventors: Yu Shiu, Taipei (TW); Chia-Hung Yeh, Tai-Nan (TW); Hsuan-Huei Shih, Taipei (TW); Chung-Chieh Kuo, Taipei (TW)

(73) Assignee: MAVs Lab. Inc., Taipei (TW)

( * ) Notice: Subject to any disclaimer, the term of this patent is extended or adjusted under 35 U.S.C. 154(b) by 1447 days.

(21) Appl. No.: 10/908,308

(22) Filed: May 6, 2005

(65) Prior Publication Data

US 2006/0252536 A1   Nov. 9, 2006

(51) Int. Cl.
*H04N 5/222* (2006.01)

(52) U.S. Cl. .................. 348/722; 348/157; 348/169; 348/515; 725/22; 715/723

(58) Field of Classification Search ................ 348/738, 348/552, 553, 699–702, 571, 512, 515, 722, 348/157, 169–172, 578, 579; 725/32–36, 725/22, 19; 386/125; 382/103, 118; 715/723, 715/722, 726

See application file for complete search history.

(56) References Cited

U.S. PATENT DOCUMENTS 6,681,398 B1 * 1/2004 Verna .......................... 725/141

| | | | |
|---|---|---|---|
| 2004/0078188 A1 | 4/2004 | Gibbon | |
| 2005/0195331 A1 * | 9/2005 | Sugano et al. | 348/571 |
| 2006/0053003 A1 * | 3/2006 | Suzuki et al. | 704/216 |
| 2006/0059120 A1 * | 3/2006 | Xiong et al. | 707/3 |

FOREIGN PATENT DOCUMENTS

| TW | 468161 | 12/2001 |
|---|---|---|
| TW | I223162 | 11/2004 |
| WO | 2004090752 A1 | 10/2004 |

OTHER PUBLICATIONS

A. D. Cheveigne and H. Kawahara, "Yin, a fundamental frequency estimator for speech and music," Journal of Acoustical Society Of America (JASA), Jan. 9, 2002, pp. 1917-1930.

M. Han, W. Hua, W. Xu and Y. Gong, "An Integrated Baseball Digest System Using Maximum Entropy Method," Proc. ACM Multimedia 2002, pp. 347-350, C&C Research Laboratories NEC USA, Inc.

M. Slaney and R.F. Lyon. "A perceptual pitch detector," Proc. ICASSP. 1990, pp. 357-360, vol. 1, Apple Computer, Inc, Cupertino, CA, USA.

(Continued)

*Primary Examiner*—M. Lee
(74) *Attorney, Agent, or Firm*—Winston Hsu

(57) ABSTRACT

A highlight detecting circuit for detecting a highlight segment within a video signal includes a pitch-tracking module for estimating a plurality of pitch values for an audio signal; a pitch difference detecting module coupled to the pitch-tracking module for computing a plurality of pitch difference values according to the pitch values; and a highlight detecting module coupled to the pitch difference detecting module for determining a starting point and a stopping point of the highlight segment according to the pitch difference values.

28 Claims, 2 Drawing Sheets

OTHER PUBLICATIONS

Y. Rui, A. Gupta, and A. Acero, "Automatically Extracting Highlights for TV Baseball Programs," Proc. ACM Multimedia 2000, pp. 105-115. Microsoft Research, One Microsoft Way, Redmond, WA, USA.

P. De La Cuadra, A. Master and C. Sapp, "Efficient Pitch Detection Techniques for Interactive Music," Proc. ICMC 2001, Sep. 2001, International Computer Music Conference, La Habana, Cuba.

* cited by examiner

HIGHLIGHT DETECTING CIRCUIT AND RELATED METHOD FOR AUDIO FEATURE-BASED HIGHLIGHT SEGMENT DETECTION

BACKGROUND OF INVENTION

1. Field of the Invention

The present invention relates to video content detection, and more particularly, to a highlight detecting circuit and related method for video highlight detection utilizing an audio signal to determine a highlight segment within a video signal.

2. Description of the Prior Art

Consider a video program containing large segments of content that are uninteresting to a viewer but the same video program also contains individual events interspersed within that contact that the viewer finds very interesting. Extracting the interesting events while discarding the boring and uninteresting content allows the viewer to less thoroughly watch the video program. The viewer can spend more time viewing only the video segments that are considered exciting. For example, during a baseball game, most of the time the audience is waiting. It takes some time for a next hitter to walk up to the plate after a previous hitter is called out. It takes some time for a pitcher to exchange signals with a catcher before they reach a consensus on what kind of ball is going to be delivered. It also takes some time for a change of inning when both teams switch the roles as offense and defense sides. Exciting events, such as home runs, scoring, and double plays exist sparsely in long baseball games. For baseball fans or regular viewers, it is difficult for them to always have plenty of time to be sitting in front of a TV and watching the whole game thoroughly. Baseball highlight detection could help extract those exciting moments and skip those waiting times.

Some prior art methods have been proposed to deal with these kinds of highlight detection problems. These methods utilize a probabilistic framework to deal with this problem and need training data to estimate the parameters of probability models. In this way, the computational complexity is very high, and the execution speed is slow, resulting in difficulty in implementing the prior art method on an embedded system.

SUMMARY OF THE INVENTION

It is therefore one of the objectives of the claimed invention to provide an apparatus and related method for video highlight detection utilizing an audio signal to determine a highlight segment to solve the above-mentioned problem.

According to an exemplary embodiment of the present invention, a highlight detecting circuit for detecting a highlight segment within a video signal is disclosed. The highlight detecting circuit includes a pitch-tracking module for estimating a plurality of pitch values for an audio signal; a pitch difference detecting module coupled to the pitch-tracking module for computing a plurality of pitch difference values according to the pitch values; and a highlight detecting module coupled to the pitch difference detecting module for determining a starting point and a stopping point of the highlight segment according to the pitch difference values.

According to an exemplary embodiment of the present invention, a method for detecting a highlight segment within a video signal is disclosed. The method includes estimating a plurality of pitch values for an audio signal; computing a plurality of pitch difference values according to the pitch values; and determining a starting point and a stopping point of the highlight segment according to the pitch difference values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
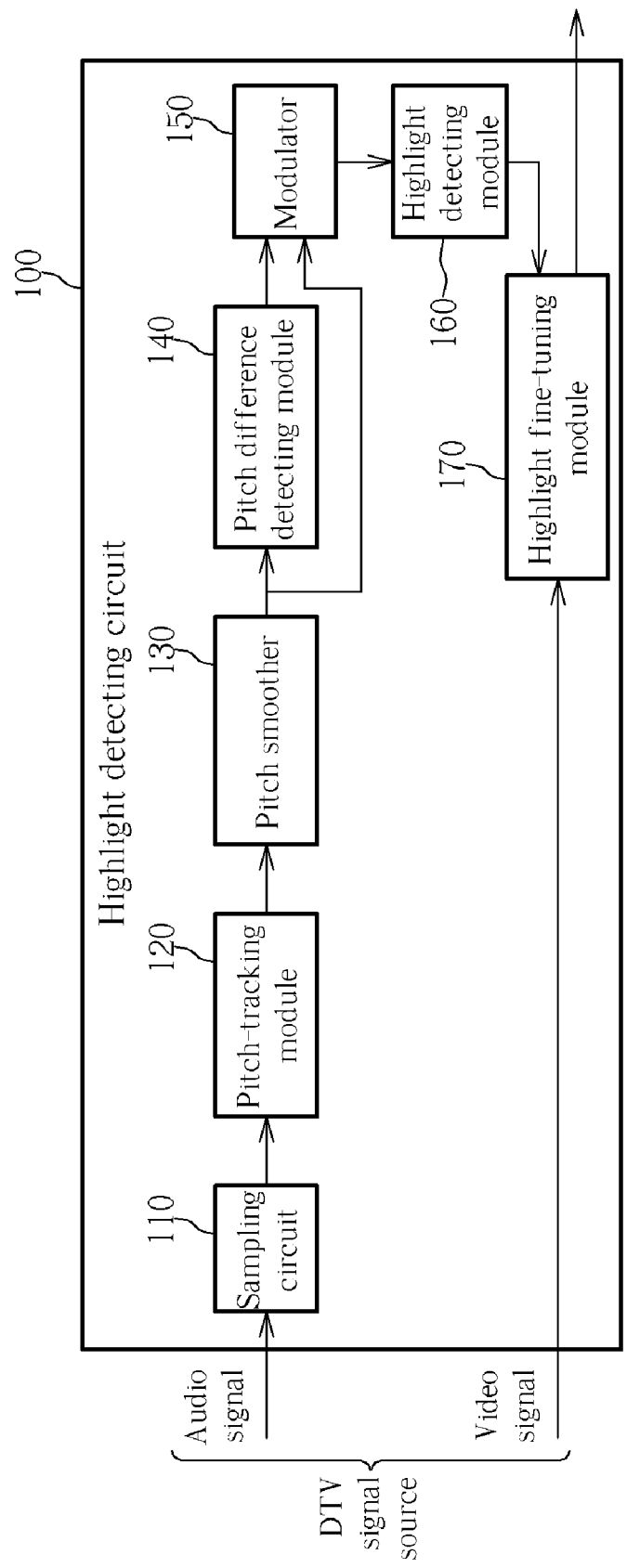
FIG. 1 is a block diagram of a highlight detecting circuit according to an embodiment of the present invention.

Please refer to FIG. 1. FIG. 1 is a block diagram of a highlight detecting circuit 100 according to an embodiment of the present invention. As shown in FIG. 1, the highlight detecting circuit 100 comprises a sampling circuit 110, a pitch-tracking module 120, a pitch smoother 130, a pitch difference detecting module 140, a modulator 150, a highlight detecting module 160, and a highlight fine-tuning module 170. The sampling circuit 110 down-samples an audio signal with an appropriate sampling rate, for example, 8000 Hz, and outputs a down-sampled audio signal to the pitch-tracking module 120 for generating a plurality of pitch values. The audio signal in this embodiment is an audio part of a baseball game broadcasted via a digital TV (DTV) signal. A video signal in this embodiment represents an image part of the baseball game broadcasted via the DTV signal. The pitch values outputted from the pitch-tracking module 120 are utilized to represent a commentator's voice during the baseball game. The commentator's voice is the basis for the following signal processing to detect a highlight segment within the video signal.

The pitch values are then fed into the pitch smoother 130. The pitch smoother 130 reduces the affect of sudden noise generated from the crowd and outputs a plurality of resulting pitch values to the pitch difference detecting module 140 and the modulator 150. The pitch difference detecting module 140 computes a plurality of pitch difference values according to the resulting pitch values and then outputs these pitch difference values to the modulator 150. The modulator 150 receives the pitch difference values and the resulting pitch values and modulates them by multiplication to output a plurality of modulated pitch difference values. The highlight detecting module 160 then determines a starting point and a stopping point of a highlight segment within the video signal coarsely according to the modulated pitch difference values. Finally, the highlight fine-tuning module 170 advances the starting point to generate an updated starting point and delays the stopping point to generate an updated stopping point according to the shot detection performed on the video signal.

The operation of the pitch-tracking module 120 is detailed as follows. Given the sampling rate of 8000 Hz, for each frame of 1024 samples (128 ms) with a sliding size of 400 samples (50 ms), prior art Fourier Transform is applied to each frame to generate a frequency-domain signal. Next, the prior art Harmonic Product Spectrum (HPS) algorithm is utilized to estimate the above-mentioned pitch values. Thus, the pitch-tracking module 120 generates 20 pitch values per second. One ordinary person skilled in the art will be familiar with the operation of the Fourier Transform and the HPS algorithm and further description is omitted here for brevity.

The outputted pitch values are the estimated commentator's voice (hereinafter, the commentator's voice is also called real pitch). However, a harmonic having a frequency twice that of the real pitch is sometimes erroneously taken as the real pitch by the HPS algorithm. The pitch-tracking module 120 will check if there is a pitch value located at half frequency of an estimated real pitch with a magnitude comparable to, for example, 50%, of a magnitude of the estimated real pitch. If true, the pitch-tracking module 120 replaces the estimated real pitch with the half pitch. In addition, an output value of the pitch-tracking module 120 will be set to zero if the output value is too small. Please note, that utilizing the HPS algorithm is only one example of a pitch tracking method. Any other operation capable of tracking a pitch, such as an autocorrelation operation, can be utilized.

Figure 2:
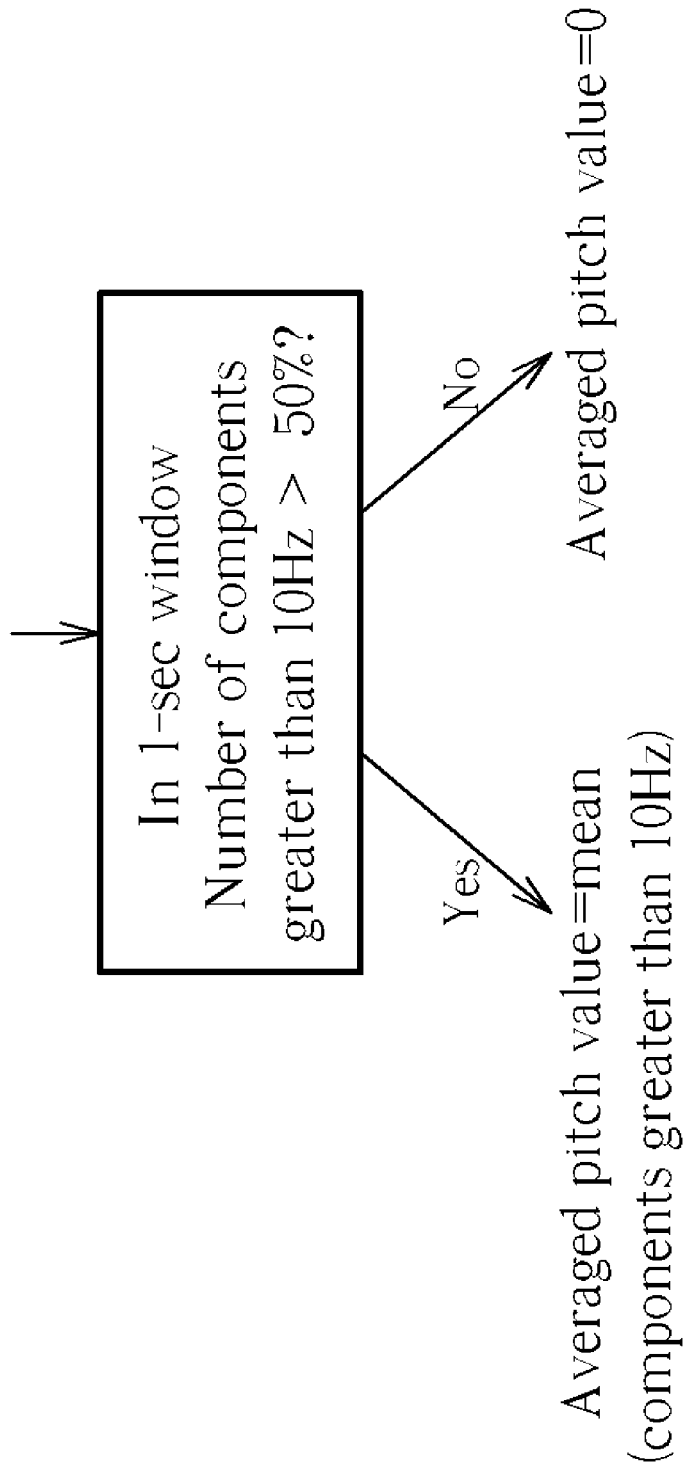
FIG. 2 is a diagram illustrating the operation of a pitch smoother shown in FIG. 1.

Please refer to FIG. 2. FIG. 2 is a diagram illustrating operation of the pitch smoother 130 shown in FIG. 1. The pitch values received in this stage include a large amount of noise from the crowd. Besides, the commentator voice is filled with many silence periods between every two words. These silence periods do not have any pitch. Therefore, the pitch smoother 130 first determines whether a plurality of pitch values in a specific window, for example, a 1-sec window, is larger than a first threshold value, for example, 10 Hz, or not macroscopically. In this embodiment, if the percentage of the pitch values larger than the first threshold value within the specific window is greater than a second threshold value, for example, 50%, the pitch smoother 130 outputs an averaged pitch value by averaging these pitch values above the first threshold value; otherwise, the pitch smoother 130 sets a predetermined value (e.g., zero) to the averaged pitch value directly. Then, this 1-sec window slides forward a sample and the pitch smoother 130 repeats the procedure detailed above.

In order to exaggerate a dramatic pitch change of the pitch values, the pitch difference detecting module 140 first determines a specific pitch difference value corresponding to a specific averaged pitch value by summing a plurality of averaged pitch values, for example, 100 averaged pitch values (corresponds to a 5-sec window), prior to the specific averaged pitch value to generate a first sum value, summing a plurality of averaged pitch values, for example, 100 averaged pitch values (corresponds to a 5-sec window), following the specific averaged pitch value to generate a second sum value, and setting the specific pitch difference value to a result obtained by subtracting the first sum value from the second sum value. The pitch difference value is then fed into the modulator 150. The modulator 150 then generates a modulated pitch difference value by multiplying a specific pitch difference value corresponding to a specific averaged pitch value by the specific averaged pitch value. Until now, a contour of a plurality of dramatic pitch changes of the commentator's voice is tracked and is represented as a plurality of peaks and valleys in the modulated pitch difference values.

The highlight detecting module 160 determines peaks from the modulated pitch difference values. Each peak represents a starting point of a highlight segment having a large pitch change. In this embodiment, if an exciting event happens, a commentator will change the voice style to express emotion, resulting in a higher pitch as well as a denser pitch without silence. Both will contribute to the modulated pitch difference values. The highlight detecting module 160 first picks a peak from the modulated pitch difference values as a starting point SP' of a highlight segment. During a period of time (say, 5-20 seconds) after the peak, the highlight detecting module 160 picks a valley on the modulated pitch difference values as a stopping point PP' of the highlight segment. Please note that selecting a peak or a valley as a starting point of a highlight segment is subjected to how the pitch difference values are defined. As mentioned above, a pitch difference value is defined as a difference of subtracting a first sum value from a second sum value and therefore, a peak should be selected as a starting point and a valley should be selected as a stopping point. On the contrary, if a pitch difference value is defined as a difference of subtracting a second sum value from a first sum value, a valley should be selected as a starting point and a peak should be selected as a stopping point.

The highlight segment detected by the starting point SP' and the stopping point PP' is coarsely determined by the highlight detecting module 160. However, the highlight segment is not a complete event because the coarsely determined starting point SP' might lag behind the actual starting time of the wanted event. Further, the highlight segment might not end smoothly due to the coarsely determined stopping point PP'. Therefore, the highlight fine-tuning module 170 fine-tunes the starting point SP' and the stopping point PP' by performing a well known shot detection operation to the video signal according to the starting point SP' and the stopping point PP' determined by the highlight detecting module 160. The shot detection is used during a period of time (say, 3-20 seconds) before the starting point SP' of the highlight segment. A time having a largest shot change in this period will be a new starting point SP for the highlight segment. Similarly, the shot detection is also utilized during a period of time (say, 1-10 seconds) after the stopping point PP' of the highlight segment. A time having a largest shot change in this period will be a new stopping point PP for the highlight segment. Thus, a fine-tuned highlight segment is determined. Please note, that utilizing the shot detection in the highlight fine-tuning module 170 is only one example of this embodiment. Any other operation or algorithm capable of fine-tuning the starting point SP' and the stopping point PP' can be utilized. Besides, since the present invention extracts highlight segments of a video program, it is especially suitable for a video program having at least one commentator to commentate the content but it should not be limited to these kinds of programs only. Then, according to the starting point SP and the stopping point PP generated by the highlight detecting circuit 100, a successive circuit can extract the highlight segment from the video signal to acquire only the image part of the DTV signal. On the other hand, the successive circuit can also extract the highlight segment from both the video signal and the audio signal to acquire the image part as well as the audio part of the DTV signal according to the starting point SP and the stopping point PP generated by the highlight detecting circuit 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A highlight detecting circuit for detecting a highlight segment within a video signal, comprising:

a pitch-tracking module for estimating a plurality of pitch values for an audio signal;

a pitch difference detecting module coupled to the pitch-tracking module for computing a plurality of pitch difference values according to the pitch values; and a highlight detecting module coupled to the pitch difference detecting module for determining a starting point and a stopping point of the highlight segment according to the pitch difference values;

wherein the video signal corresponds to an image part of a signal source and the audio signal corresponds to an audio part of the signal source; and, with respect to generation of a specific pitch difference value, the pitch difference detecting module determines the specific pitch difference value for a specific pitch value by summing a plurality of pitch values prior to the specific pitch value to generate a first sum value, summing a plurality of pitch values following the specific pitch value to generate a second sum value, and setting the specific pitch difference value by a difference between the first and second sum values.

2. The highlight detecting circuit of claim 1, further comprising:
a pitch smoother coupled between the pitch-tracking module and the pitch difference detecting module for averaging a plurality of pitch values in each window to generate a plurality of averaged pitch values, respectively;
wherein the pitch difference detecting module generates the pitch difference values according to the averaged pitch values.

3. The highlight detecting circuit of claim 2, wherein the pitch smoother sets a predetermined value to an averaged pitch value of a specific window if a percentage of pitch values in the specific window being less than a first threshold value, reaches a second threshold value, and the pitch smoother averages pitch values in the specific window, which are not less than the first threshold value, to generate an averaged pitch value of the specific window if the percentage of pitch values in the specific window being less than the first threshold value does not reach the second threshold value.

4. The highlight detecting circuit of claim 1, further comprising:
a modulator coupled between the pitch difference detecting module and the highlight detecting module for generating a plurality of modulated pitch difference values, the modulator generates a specific modulated pitch difference value for a specific pitch value by multiplying a specific pitch difference value corresponding to the specific pitch value by the specific pitch value;
wherein the highlight detecting module determines the starting and stopping points according to the modulated pitch difference values.

5. The highlight detecting circuit of claim 1, further comprising:
a highlight fine-tuning module coupled to the highlight detecting module for advancing the starting point or delaying the stopping point according to the video signal.

6. The highlight detecting circuit of claim 5, wherein the highlight fine-tuning module performs a shot detection upon the video signal to advance the starting point or delay the stopping point.

7. The highlight detecting circuit of claim 1, wherein the pitch-tracking module performs a Fourier transform upon the audio signal to generate a frequency-domain signal, and then performs a harmonic product spectrum (HPS) algorithm upon the frequency-domain signal to estimate the pitch values.

8. The highlight detecting circuit of claim 7, wherein the pitch-tracking module further replaces a first pitch value estimated by the HPS operation with a second pitch value if a magnitude of the second pitch value is greater than a specific percentage of a magnitude of the first pitch value, and a pitch corresponding to the second pitch value is half a pitch corresponding to the first pitch value.

9. The highlight detecting circuit of claim 1, wherein the pitch-tracking module performs a Fourier transform upon the audio signal to generate a frequency-domain signal, and then performs an autocorrelation operation upon the frequency-domain signal to estimate the pitch values.

10. The highlight detecting circuit of claim 1, wherein the signal source is a digital TV signal.

11. The highlight detecting circuit of claim 1, further comprising:
a sampling circuit coupled to the pitch-tracking module for down-sampling the audio signal and for outputting a down-sampled audio signal to the pitch-tracking module.

12. A method for detecting a highlight segment within a video signal, comprising:
estimating a plurality of pitch values for an audio signal;
computing a plurality of pitch difference values according to the pitch values; and
determining a starting point and a stopping point of the highlight segment according to the pitch difference values;
wherein the video signal corresponds to an image part of a signal source, and the audio signal corresponds to an audio part of the signal source; and the step of computing the pitch difference values determines a specific pitch difference value for a specific pitch value by summing a plurality of pitch values prior to the specific pitch value to generate a first sum value, summing a plurality of pitch values following the specific pitch value to generate a second sum value, and setting the specific pitch difference value by a difference between the first and second sum values.

13. The method of claim 12, further comprising:
averaging a plurality of pitch values in each window to generate a plurality of averaged pitch values, respectively;
wherein the pitch difference values are computed according to the averaged pitch values.

14. The method of claim 13, wherein the step of averaging the pitch values further comprises:
setting a predetermined value to an averaged pitch value of a specific window, if a percentage of pitch values in the specific window being less than a first threshold value, reaches a second threshold value, and
averaging a plurality of pitch values, which are not less than the first threshold value, to generate an averaged pitch value of the specific window if the percentage of pitch values in the specific window being less than the first threshold value, does not reach the second threshold value.

15. The method of claim 12, further comprising:
generating a plurality of modulated pitch difference values, a specific modulated pitch difference value for a specific pitch value is generated by multiplying a specific pitch difference value corresponding to the specific pitch value by the specific pitch value;
wherein the starting and stopping points are determined according to the modulated pitch difference values.

16. The method of claim 12, further comprising:
advancing the starting point or delaying the stopping point according to the video signal.

17. The method of claim 16, wherein a shot detection is performed upon the video signal to advance the starting point or delay the stopping point.

18. The method of claim 12, wherein the step of estimating the pitch values further comprises performing a Fourier transform operation upon the audio signal to generate a frequency-domain signal, and then performing a harmonic product spectrum (HPS) algorithm upon the frequency-domain signal to estimate the pitch values.

19. The method of claim 18, wherein the step of estimating the pitch values further comprises:
  replacing a first pitch value estimated by the HPS operation with a second pitch value if a magnitude of the second pitch value is greater than a specific percentage of a magnitude of the first pitch value, a pitch corresponding to the second pitch value being half a pitch corresponding to the first pitch value.

20. The method of claim 12, wherein the step of estimating the pitch values further comprises performing a Fourier transform operation upon the audio signal to generate a frequency-domain signal, and then performing an autocorrelation operation upon the frequency-domain signal to estimate the pitch values.

21. The method of claim 12, wherein the signal source is a digital TV signal.

22. The method of claim 10, further comprising:
  down-sampling the audio signal to generate a down-sampled audio signal;
  wherein the pitch values are estimated according to the down-sampled audio signal.

23. A highlight detecting circuit for detecting a highlight segment within a video signal, comprising:
  a pitch-tracking module for estimating a plurality of pitch values for an audio signal;
  a pitch difference detecting module coupled to the pitch-tracking module for computing a plurality of pitch difference values according to the pitch values;
  a highlight detecting module coupled to the pitch difference detecting module for determining a starting point and a stopping point of the highlight segment according to the pitch difference values; and
  a pitch smoother coupled between the pitch-tracking module and the pitch difference detecting module for averaging a plurality of pitch values in each window to generate a plurality of averaged pitch values, respectively;
  wherein the pitch smoother sets a predetermined value to an averaged pitch value of a specific window if a percentage of pitch values in the specific window being less than a first threshold value, reaches a second threshold value, and the pitch smoother averages pitch values in the specific window, which are not less than the first threshold value, to generate an averaged pitch value of the specific window if the percentage of pitch values in the specific window being less than the first threshold value does not reach the second threshold value; the pitch difference detecting module generates the pitch difference values according to the averaged pitch values; and the video signal corresponds to an image part of a signal source and the audio signal corresponds to an audio part of the signal source.

24. A highlight detecting circuit for detecting a highlight segment within a video signal, comprising:
  a pitch-tracking module for estimating a plurality of pitch values for an audio signal;
  a pitch difference detecting module coupled to the pitch-tracking module for computing a plurality of pitch difference values according to the pitch values;
  a highlight detecting module coupled to the pitch difference detecting module for determining a starting point and a stopping point of the highlight segment according to the pitch difference values; and
  a modulator coupled between the pitch difference detecting module and the highlight detecting module for generating a plurality of modulated pitch difference values, the modulator generates a specific modulated pitch difference value for a specific pitch value by multiplying a specific pitch difference value corresponding to the specific pitch value by the specific pitch value;
  wherein the video signal corresponds to an image part of a signal source and the audio signal corresponds to an audio part of the signal source; and the highlight detecting module determines the starting and stopping points according to the modulated pitch difference values.

25. A highlight detecting circuit for detecting a highlight segment within a video signal, comprising:
  a pitch-tracking module for estimating a plurality of pitch values for an audio signal;
  a pitch difference detecting module coupled to the pitch-tracking module for computing a plurality of pitch difference values according to the pitch values; and
  a highlight detecting module coupled to the pitch difference detecting module for determining a starting point and a stopping point of the highlight segment according to the pitch difference values;
  wherein the pitch-tracking module performs a Fourier transform upon the audio signal to generate a frequency-domain signal, and then performs a harmonic product spectrum (HPS) algorithm upon the frequency-domain signal to estimate the pitch values and further replaces a first pitch value estimated by the HPS operation with a second pitch value if a magnitude of the second pitch value is greater than a specific percentage of a magnitude of the first pitch value, and a pitch corresponding to the second pitch value is half a pitch corresponding to the first pitch value; and the video signal corresponds to an image part of a signal source and the audio signal corresponds to an audio part of the signal source.

26. A method for detecting a highlight segment within a video signal, comprising:
  estimating a plurality of pitch values for an audio signal;
  averaging a plurality of pitch values in each window to generate a plurality of averaged pitch values respectively, the step of averaging the pitch values comprising:
    setting a predetermined value to an averaged pitch value of a specific window, if a percentage of pitch values in the specific window being less than a first threshold value, reaches a second threshold value, and
    averaging a plurality of pitch values, which are not less than the first threshold value, to generate an averaged pitch value of the specific window if the percentage of pitch values in the specific window being less than the first threshold value, does not reach the second threshold value;
  computing a plurality of pitch difference values according to the averaged pitch values; and
  determining a starting point and a stopping point of the highlight segment according to the pitch difference values;
  wherein the video signal corresponds to an image part of a signal source, and the audio signal corresponds to an audio part of the signal source.

27. A method for detecting a highlight segment within a video signal, comprising:
  estimating a plurality of pitch values for an audio signal;
  computing a plurality of pitch difference values according to the pitch values;
  generating a plurality of modulated pitch difference values, a specific modulated pitch difference value for a specific pitch value is generated by multiplying a specific pitch difference value corresponding to the specific pitch value by the specific pitch value; and determining a starting point and a stopping point of the highlight segment according to the modulated pitch difference values;

wherein the video signal corresponds to an image part of a signal source, and the audio signal corresponds to an audio part of the signal source.

28. A method for detecting a highlight segment within a video signal, comprising:

estimating a plurality of pitch values for an audio signal, the step of estimating the pitch values comprising:

performing a Fourier transform operation upon the audio signal to generate a frequency-domain signal;

performing a harmonic product spectrum (HPS) algorithm upon the frequency-domain signal to estimate the pitch values; and replacing a first pitch value estimated by the HPS operation with a second pitch value if a magnitude of the second pitch value is greater than a specific percentage of a magnitude of the first pitch value, a pitch corresponding to the second pitch value being half a pitch corresponding to the first pitch value;

computing a plurality of pitch difference values according to the pitch values; and determining a starting point and a stopping point of the highlight segment according to the pitch difference values;

wherein the video signal corresponds to an image part of a signal source, and the audio signal corresponds to an audio part of the signal source.

* * * * *